June 19, 1956 — J. C. HAGGART, JR — 2,750,980
LOCK-NUT HAVING FASTENING ZONE AND
COLUMNAR SUPPORTED LOCKING ZONE
Filed Sept. 18, 1952 — 3 Sheets-Sheet 1

INVENTOR.
JOHN C. HAGGART, JR.
BY
ATTORNEY

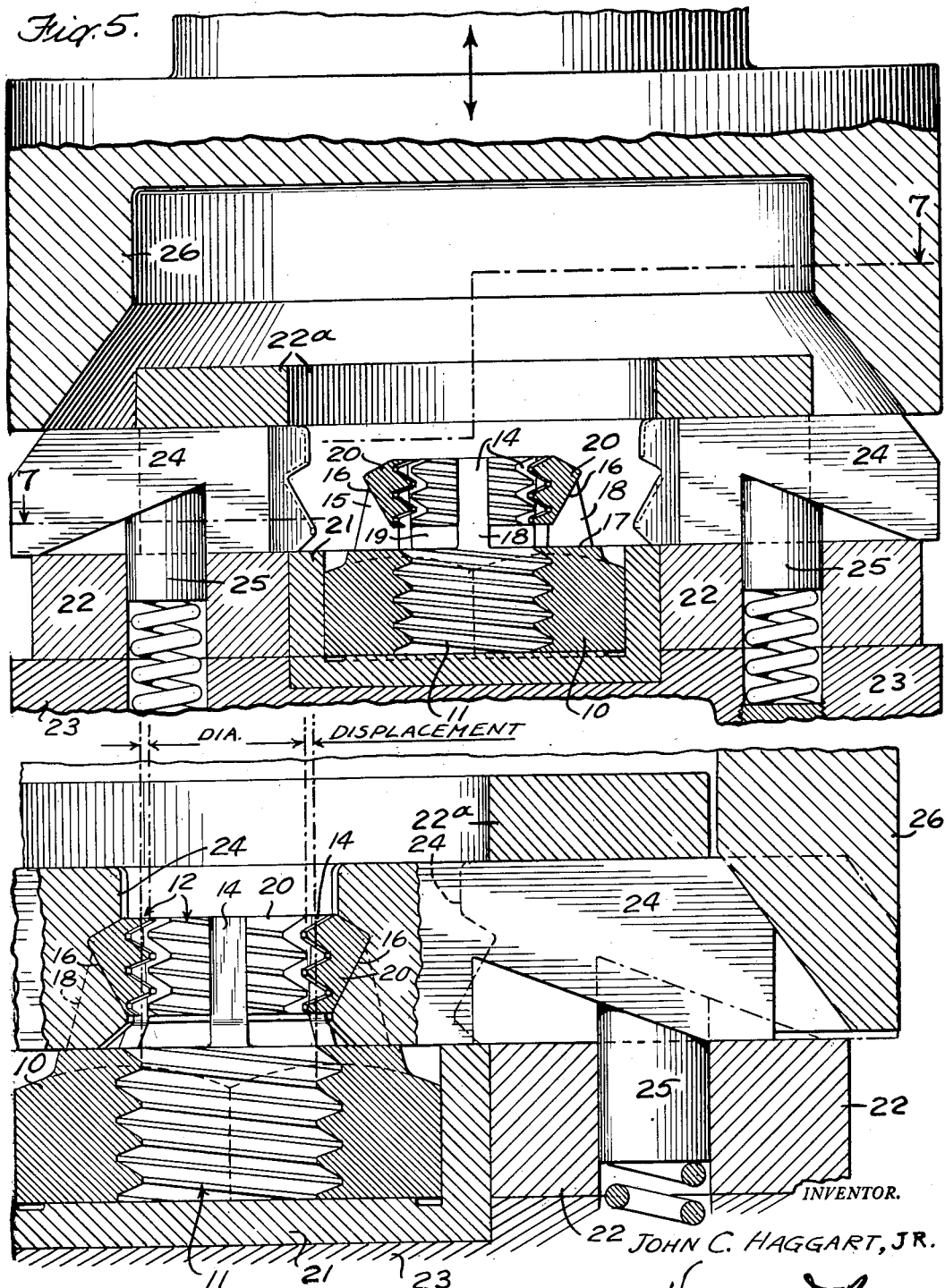

June 19, 1956     J. C. HAGGART, JR     2,750,980
LOCK-NUT HAVING FASTENING ZONE AND
COLUMNAR SUPPORTED LOCKING ZONE
Filed Sept. 18, 1952     3 Sheets-Sheet 3
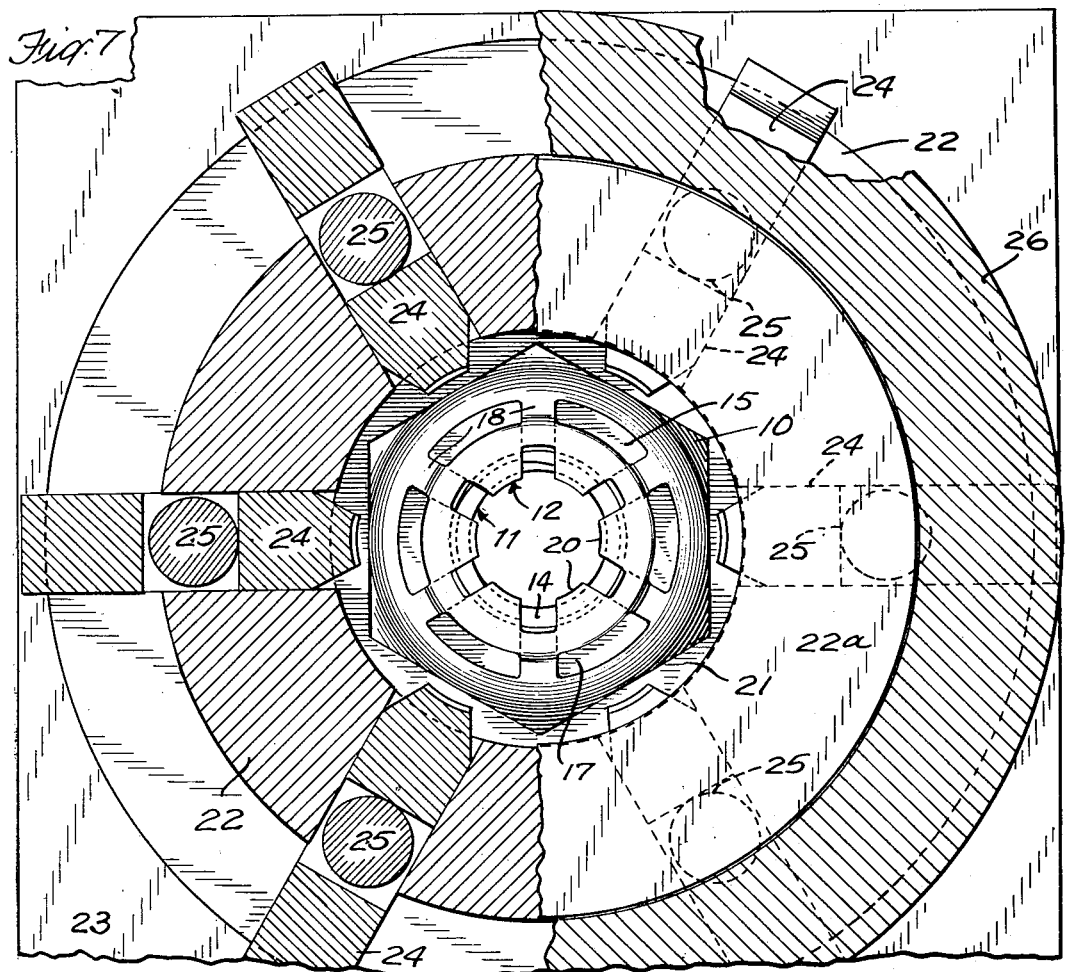
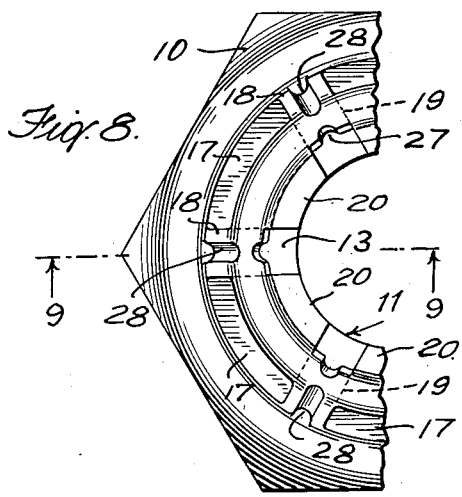
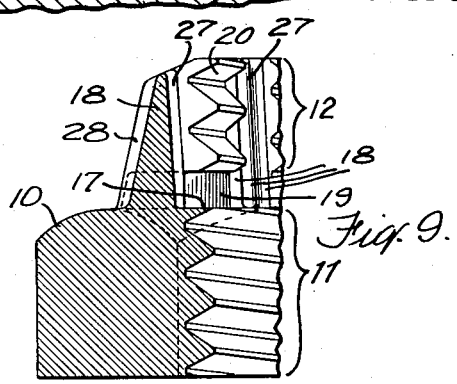
INVENTOR.
JOHN C. HAGGART, JR.
BY *Victor D. Borst*
ATTORNEY

United States Patent Office 2,750,980
Patented June 19, 1956

2,750,980

LOCK NUT HAVING FASTENING ZONE AND COLUMNAR SUPPORTED LOCKING ZONE

John C. Haggart, Jr., Los Angeles, Calif.

Application September 18, 1952, Serial No. 310,245

3 Claims. (Cl. 151—21)

This invention relates to the type of one piece lock nuts which have two coaxial zones or sections, one of which is shaped to receive the wrench and fits freely on the cooperative thread and is termed the fastening zone and the other of which has the locking function and is termed the locking zone. The locking zone is generally a ring smaller in external cross section than that of the fastening zone and in some instances has segmental portions which are deformed, commonly by applying a tool to bend their outer ends inwardly, thus reducing the pitch diameter of the threads and causing them to bind on the threads of a screw or bolt to which the nut is applied. Obviously such bending of the segments causes a certain deformation of the threads in the region where the flexing occurs, and the pitch diameter of the thread varies from minimum at the outer ends of the segments to the normal or tapped diameter at their inner ends.

It is well known that such lock nuts have a limited utility with screws or bolts the threads of which have the usual manufacturing variations and that they are not efficient for reuse. In other words their life and utility are limited.

A purpose of this invention is to provide a lock nut which can be cheaply made and which will be susceptible of indefinite use and reuse and which will be highly efficient irrespective of manufacturing variations in the threads of the screws or bolts with which they are used. Another object is to avoid initial looseness after the nut has been thoroughly tightened. Still other objects will appear as the description proceeds.

To these ends the invention comprehends a nut having on one face an annular axial extension constituting the locking zone or ring. This locking ring is circumferentially continuous and integral, coaxial with the fastening portion and of substantially uniform axial cross section throughout and is axially spaced from the fastening portion. Its internal diameter is at least as large as the major diameter of the threads of the fastening portion and it has on its inner face a plurality of equally spaced inwardly extending threaded projections forming threaded segments. The ring is attached to the fastening portion of the nut by columnar supports which are resiliently yielding and are circumferentially arranged and disposed between the said segments. In other words this locking ring is made up of a plurality of threaded segments, usually six in number, joined together on intermediate columns or pillars. The segments have their threaded faces parallel with the axis of the nut, the pitch diameter of the threads of the segments being uniform throughout their length, and this pitch diameter is somewhat less than that of the thread in the main portion of the nut. The support of the segments is such that they are free to expand or contract relative to the main nut portion, the columns being capable of flexing on their bases to and from the axis of the nut to accommodate any change in the dimensions of the ring. Also the columns are capable of flexing resiliently laterally or tangentially.

The blank for the nut is fabricated with a circumferential internal groove at the base of the ring and with axial grooves in the inner face of the ring which divide the ring threads into the segmental portions. In the preferred form, the outer wall of each segment is recessed in the form of a bevelled undercut which is bounded at its sides by radial planes and its tapered inner end is continued through the wall into the base of the nut, thereby forming open slots and leaving the bottoms of the segments free of the main nut portion. Thus the segments span the columns which are the portions left between the radial planes in a manner to be readily susceptible of relative radial displacement.

The nut is then tapped, the thread in the two zones or portions being in phase but interrupted by the circumferential groove and by the vertical grooves in the locking ring. Tools are then applied to the several segments and they are forced inwardly, the metal of the columns where the segments are attached being caused to flow sufficiently to give the segments a permanent set somewhat inwardly displaced from their tapped positions. Thus the pitch diameter of their thread is reduced sufficiently to cause the segments to grip the inserted screw with a locking force. The columns are sufficiently flexible to yield resiliently at their bases as the screw is inserted, the displacement being only enough to develop the requisite inward pressure on the screw or bolt. In no case will this cause sufficient change in relative thread position to interfere with the entrance of the bolt-thread into the locking zone after passing through the fastening zone. An axial stress, however, is thereby developed which is a spring action that tends to prevent initial looseness after tightening.

Sometimes, especially with larger sizes, it may be desirable to further reduce the metal of the columns to enhance their flexibility and this may be done by providing longitudinal grooves in either or both of their front and rear edges.

The invention comprehends other features of construction which will appear from the following description of the embodiment shown in the accompanying drawings in which:

Fig. 5 is a sectional elevation of a nut and of the resizing mechanism for inwardly camming the locking segments, the nut and mechanism being shown before the displacement or resizing operation and the resizing cam being shown partly in elevation.

Fig. 6 is a view similar to Fig. 5 on a somewhat larger scale of the nut and a portion of the apparatus at the conclusion of the resizing operation.

Fig. 7 is a sectional plan of the resizing mechanism taken on broken line 7—7 of Fig. 5 and showing the nut in plan as it is after the resizing operation as shown in Fig. 6, a portion of the resizing cam being broken away at one point.

Figs. 8 and 9 are fragmentary plan and sectional elevational views, respectively, of a modified form of nut to enhance the flexibility of the columns.

Figure 1:
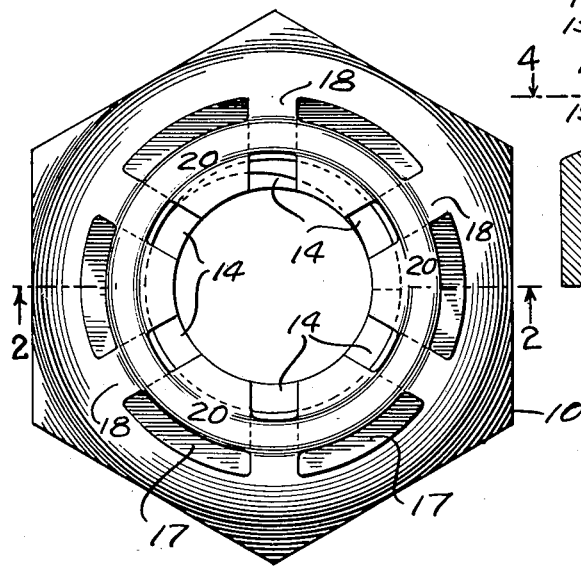
Fig. 1 is a plan of a lock nut made according to the invention.
Figure 2:
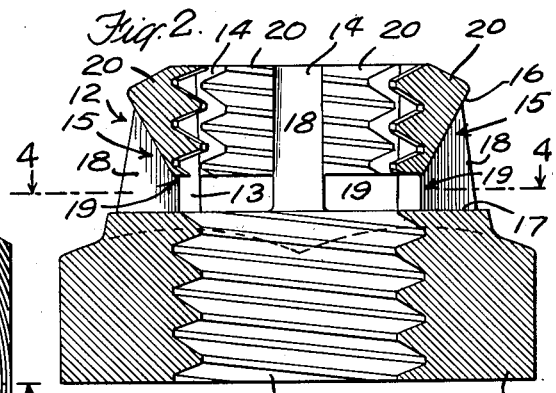
Fig. 2 is a sectional elevation of the same on line 2—2 of Fig. 1.
Figure 3:
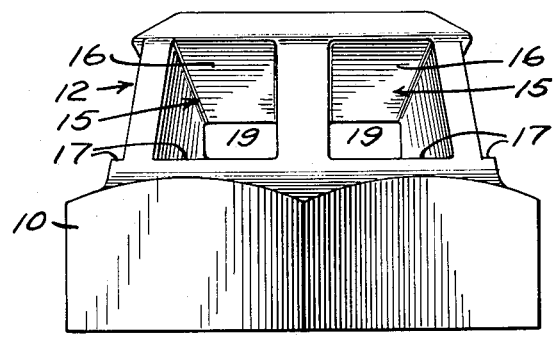
Fig. 3 is an elevation of the nut.
Figure 4:
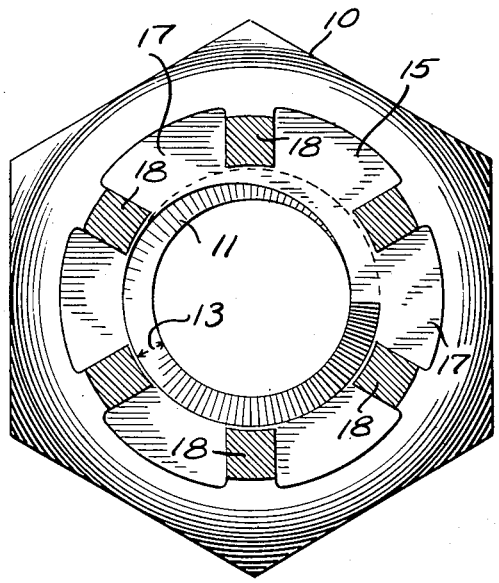
Fig. 4 is a sectional plan on line 4—4 of Fig. 2.

The untapped nut blank may be formed in any suitable manner. In practice it is formed from inexpensive sheet stock by a series of combined drawing and cold swaging die operations which result in the product shown in Figures 1 to 4, inclusive, without the screw threads. The blank is then tapped continuously from end to end, the thread being interrupted by the grooves in the locking ring but being in phase throughout. Following that the locking ring is resized, as will be described.

In its original tapped form shown in Figs. 1 to 4, the nut has the conventional hexagonal base 10 having a central screw threaded bore 11 and termed the fastening zone herein. Coaxially integral with one face is an extension termed herein the locking zone and designated generally by the number 12. This locking zone is in the form of an annulus and is therefore also called the locking ring. It is substantially reduced in external size from the base and is designed to constitute six segmental ring portions which respectively span the spaces between six rectangular columns. The columns are the only supports for the segments, there being a slot under each segment which separates it from the fastening zone portion 10. The connections of the segments with the columns are further reduced to a mere triangular area by reason of a beveled recess formed in the outer face of each segment.

At the base of the locking ring at its juncture with the hexagonal portion 10 there is formed an internal circumferential groove 13 which is at least as deep as the depth of the screw thread and at least as wide as the pitch of the thread. Also the locking ring is provided with six equally spaced internal axial grooves 14 of like depth which extend throughout the length of the locking zone. The outer wall of the ring has six radially tapered recesses 15 formed in it, the sides of which are the radial planes coincident with the sides of the radial grooves 14. The top walls 16 of the recesses slope downwardly and the bottom wall 17 is the top surface of the main nut portion 10.

The metal left between the adjacent recesses 15 constitutes the columns 18, six in number, and between these columns the groove 13 opens into the recesses 15 forming slots 19. The groove 13 therefore only exists as a groove in the inner edges of the columns 18 and is elsewhere a series of slots.

Thus there are formed six segments 20 which are approximately triangular in cross section, the top face being bevelled off from the root of the screw thread, as shown. Their supports are their connections with the columns at each end, the slots 19 providing clearance at their bottoms. Initially these segments have the same bore size as that in the nut portion 10, and the locking portion 12 is tapped in continuation with the main nut portion 10 so that initially the threads are all in phase and the nut is in the condition shown in Figs. 1 to 4, inclusive.

The next operation is that shown in Figs. 5, 6, and 7, in which the locking ring is resized by inward radial displacement of the segments in parallelism with the axis of the nut. The nut is placed in a retainer cup 21 in a ring 22 on a base 23. The ring has six radial slots in it in radial alinement with the segments 20 of the nut through which resizing bars 24 operate. These bars are rectangular in cross section and have their inner ends shaped complementary to the outer faces of the segments. Their outer ends are bevelled off to form cam surfaces and project into the open beyond the ends of the slots, being held in their slots by a smaller ring 22a secured on the ring 22. The underside of each bar has a retractile cam surface which is engaged by a spring pressed retractile plunger 25 to automatically retract the bars at the conclusion of their resizing operation.

The bars are cammed in by a power operated cam 26 which is operated by a conventional power press. The cam is shown in Fig. 5 on its way down and in Fig. 6 in its extreme down position. In Fig. 7 the nut is shown as resized and the bars and cam retracted to the position of Fig. 5.

The outer faces of the segments are in the form of a salient angle which fit into the complementary reentrant angle in the ends of the resizing bars 24, as shown in Fig. 6. The displacement of the segments is shown somewhat exaggerated in Figs. 6 and 7, and it will be observed that the bases of the columns are shown as having an inward inclination after resizing. This is the permanent shape imparted to the columns and the segments are thereby brought in by a movement parallel with the face 17. The threaded faces of the segments therefore remain parallel with the axis of the nut. For small size nuts this inward displacement is slight and consequently the phase disagreement resulting therefrom is not considerable. The bolt thread does not therefore have any considerable difficulty in entering the locking zone because of the thread displacement. It does however encounter resistance because of the lesser pitch diameter and tends to return the locking zone to its original position, which the resilience of the bases of the columns permits. The elasticity of the material resists this force and tends to recover in the direction of the hand of the thread. This spring action tends to prevent initial looseness after the nut has been thoroughly tightened.

It will be observed that the six slots 19, being equal in axial dimension to the pitch of the thread, may be used to match a hole drilled in the bolt for a wire or cotter pin, and the frictional lock be thereby supplemented.

The flexibility of the columns 18 may be increased by longitudinal grooves 27 and 28 in their inner and outer edges, respectively, as shown in Figs. 8 and 9. This provides in effect a sinuous locking ring which materially increases the ability of the ring to expand and recover.

It will be apparent that the locking ring can be so designed that as a circumferential spring it will be so flexible that it will spring away from the tap when the thread is cut. In such case after the tap is withdrawn the locking ring will spring back and then the pitch diameter of the threads in the locking zone will be smaller than the pitch diameter in the fastening zone.

It is obvious that various modifications may be made in the embodiment of the invention shown in the drawings and above particularly described within the principles and scope of the invention as defined in the following claims.

What is claimed is:

1. An integral lock nut having a conventional polygonal threaded fastening portion of uniform pitch diameter and a reduced locking portion integrally attached to and extending from one face of the fastening portion, said locking portion comprising a circumferentially continuous and integral circular ring portion of substantially uniform axial cross section throughout coaxial with and axially spaced from the fastening portion and having an internal diameter throughout its length at least as large as the major diameter of the threads of the fastening portion and having on its inner face a plurality of equally spaced axially extending internally screw threaded projections forming a plurality of more than two spaced substantially non-deformable threaded segments, the screw threads of the fastening and locking portions being of the same pitch and lead and the threads of said locking portion being of uniform pitch diameter which is smaller than that of the threads of said fastening portion, said ring being attached to the fastening portion of the nut only by resiliently yielding columnar supports extending downwardly to said fastening portion from the bottom of said ring portion circumferentially between said inwardly extending threaded segments.

2. A lock nut as defined in claim 1 in which the screw threads in the fastening and locking portions of the nut are substantially in phase when the threaded segments are radially displaced and their pitch diameter is expanded to that of the fastening portion.

3. A lock nut as defined in claim 1 in which the ring portion is triangular in axial cross section.

References Cited in the file of this patent

UNITED STATES PATENTS

| | | |
|---|---|---|
| 1,905,621 | Cole | Apr. 25, 1933 |
| 1,971,548 | Wilcox | Apr. 28, 1934 |
| 2,007,293 | Cayouette | July 9, 1935 |
| 2,101,888 | Ambrosius | Dec. 14, 1927 |

(Other references on following page)

UNITED STATES PATENTS

| | | |
|---|---|---|
| 2,320,785 | Luce | June 1, 1943 |
| 2,395,141 | Poupitch | Feb. 19, 1946 |
| 2,454,444 | Poupitch | Nov. 23, 1948 |
| 2,478,231 | Bowers | Aug. 9, 1949 |
| 2,563,162 | Eckenbeck | Aug. 7, 1951 |
| 2,580,745 | Engstrom | Jan. 1, 1952 |

FOREIGN PATENTS

| | | |
|---|---|---|
| 551,534 | Great Britain | Feb. 26, 1943 |
| 567,770 | Great Britain | Mar. 1, 1945 |
| 929,985 | France | July 28, 1947 |